Patented Mar. 25, 1941

2,236,148

UNITED STATES PATENT OFFICE 2,236,148

WELDING ROD

Arthur R. Lytle, Niagara Falls, N. Y., assignor to The Oxweld Railroad Service Company, a corporation of Delaware No Drawing. Application October 26, 1939, Serial No. 301,373

3 Claims. (Cl. 219—8)

The invention relates to railway track members having a body portion of one composition which is at least in part cased or armored with another composition having greater hardness and wear resistance than said body portion. The invention also includes a welding rod of novel composition for use in applying armor of the kind mentioned.

Railway track members must be tough, hard, and wear-resistant. To insure the best possible combination of such properties it has been proposed to make track members of a tough carbon steel, and then to apply, by welding methods, to the wearing surfaces of the members an armor or casing, usually of alloy steel, having a desired hardness, toughness, and wear-resistance when so deposited. One steel which has proved successful for such use contains 0.5% to 3% chromium, 0.2% to 1% carbon, 0.5% to 1.75% manganese, and 0.3% to 1.5% silicon. This material is hard, has excellent resistance to wear, and is easily welded to the body to be armored. Nevertheless there is a demand for an even harder and more wear-resistant material which is sufficiently tough for such use.

It is an object of the present invention to provide a railway track member comprising a tough body portion and an armored portion having improved hardness and wear resistance. Another object is to provide a track member armored with a material having a Brinell hardness of at least 400 when deposited by oxyacetylene welding. Still another object is the provision of a welding rod of novel composition for use in armoring railway track members and other articles by oxyacetylene welding.

I have discovered that these and other objects may be achieved by the use for armoring track members of a steel containing about 2.5% to 5% (preferably more than 3%) chromium. Preferably, manganese and silicon are present in the steel in a definite ratio of manganese content to silicon content.

The invention comprises a steel welding rod containing, in addition to iron and incidental impurities, 2.5% to 5% chromium; 0.3% to 0.7% carbon; preferably 0.5% to 1.5% silicon; and preferably manganese in a proportion from 1 to 1.75 times the silicon content. In a preferred embodiment, the chromium content is greater than 3% and the silicon content is between 0.6% and 1.25%.

A steel having the composition described has excellent welding properties. A hard, tough deposit free from cracks may be made onto a rail by the usual welding methods. The use of the preferred proportions of manganese and silicon insures the production of a slag on welding which is fluid but not too fluid and which is easily floated to the surface, protecting the molten weld metal from undesirable oxidation during the welding operation and thereby leaving a sound, clean deposit of weld metal.

In a typical use of the invention a deposit was made from a welding rod containing 2.75% chromium, 0.44% carbon, 1.39% manganese, and 0.89% silicon (manganese to silicon ratio=1.5 to 1) by oxyacetylene welding methods. This rod had excellent welding properties, and a slag of good consistency was obtained.

The Brinell hardness of a welded deposit produced by the use of a welding rod having the composition described is about 375 to 500. Further, such a deposit is tough, resistant to wear, clean, and sound and is accordingly well suited to use for armoring railway track members. Unlike other welded deposits having a Brinell hardness of about 400 or more, it has no tendency to flake in service.

While the invention has been described with particular reference to railway track members, it is equally suited to use in other applications where an article having a tough body portion armored with another composition is desired.

I claim:

1. Welding rod comprising more than 3% but less than 5% chromium; 0.3% to 0.7% carbon; the remainder iron and minor proportions of manganese and silicon, the manganese and silicon being in a proportion sufficient to cause the formation of a fluid slag when the rod is used for welding.

2. Welding rod comprising 2.5% to 5% chromium; 0.3% to 0.7% carbon; 0.5% to 1.5% silicon; and manganese, the manganese content being in a proportion equal to 1 to 1.75 times the silicon content; the remainder iron and incidental impurities.

3. Welding rod comprising 3% to 5% chromium; 0.3% to 0.7% carbon; 0.6% to 1.25% silicon; and manganese, the manganese being present in a proportion equal to 1 to 1.75 times the silicon content; the remainder iron and incidental impurities.

ARTHUR R. LYTLE.